US012789484B2

(12) United States Patent
Giulietti et al.

(10) Patent No.: US 12,789,484 B2
(45) Date of Patent: Nov. 10, 2026

(54) KIT FOR REPAIRING DAMAGES IN TUBULAR ELEMENTS, PARTICULARLY METHANE GAS PIPELINES

(71) Applicant: Composite Research S.r.l., Pinerolo (IT)

(72) Inventors: Nicola Giulietti, Pinerolo (IT); Eugenio Fossat, Pinerolo (IT)

(73) Assignee: Composite Research S.r.l., Pinerolo (IT)

( * ) Notice: Subject to any disclaimer, the term of this patent is extended or adjusted under 35 U.S.C. 154(b) by 128 days.

(21) Appl. No.: 18/842,460

(22) PCT Filed: Mar. 2, 2023

(86) PCT No.: PCT/IB2023/051934

§ 371 (c)(1),
(2) Date: Aug. 29, 2024

(87) PCT Pub. No.: WO2023/166451

PCT Pub. Date: Sep. 7, 2023

(65) Prior Publication Data

US 2025/0187280 A1 Jun. 12, 2025

(30) Foreign Application Priority Data

Mar. 2, 2022 (IT) ........................ 102022000003956

(51) Int. Cl.
*B29C 65/00* (2006.01)
*B29C 73/10* (2006.01)
(Continued)

(52) U.S. Cl.
CPC .............. *B29C 73/10* (2013.01); *B29C 65/56* (2013.01); *B29C 65/665* (2013.01);
(Continued)

(58) Field of Classification Search
CPC ... B29C 65/46; B29C 65/665; B29C 66/5221; B29C 73/10; F16L 13/103
See application file for complete search history.

(56) References Cited

U.S. PATENT DOCUMENTS 10,100,964 B1 * 10/2018 Scott .................. F16L 55/1608
2014/0048164 A1 2/2014 Souza
(Continued)

FOREIGN PATENT DOCUMENTS

DE 8500777 U1 7/1986

OTHER PUBLICATIONS

Search Report and Written Opinion dated Jun. 1, 2023. 10 pages.

*Primary Examiner* — Philip C Tucker
*Assistant Examiner* — Nickolas R Harm
(74) *Attorney, Agent, or Firm* — RMCK Law Group PLC

(57) ABSTRACT

There is described a kit for repairing damages in tubular elements, particularly methane gas pipelines, that includes: a filler material configured for application at a damage of a tubular element in order to occlude a lumen of said damage, a lining material configured for application onto an outer surface of said tubular element in order to cover said damage, and a shell configured for application onto at least part of said lining material at an external position to said lining material. Moreover, there is described a method for repairing damages in tubular elements by employing the kit.

17 Claims, 6 Drawing Sheets

(51) Int. Cl.
*B29C 65/56* (2006.01)
*B29C 65/66* (2006.01)
*B29L 23/00* (2006.01)
*F16L 13/10* (2006.01)

(52) U.S. Cl.
CPC ....... *B29C 66/5221* (2013.01); *B29L 2023/22* (2013.01); *F16L 13/103* (2013.01)

(56) References Cited

U.S. PATENT DOCUMENTS

2016/0279865 A1* 9/2016 Souza ..................... B29C 73/10
2019/0049056 A1* 2/2019 Cercone ................ F16L 55/175
2022/0057025 A1* 2/2022 Kryger ............... C08G 59/4021

* cited by examiner

KIT FOR REPAIRING DAMAGES IN TUBULAR ELEMENTS, PARTICULARLY METHANE GAS PIPELINES

CROSS-REFERENCE TO RELATED APPLICATION

This application is a 371 National Stage of International Application No. PCT/IB2023/051934, filed Mar. 2, 2023, which claims priority to Italian Patent Application No. 102022000003956 filed Mar. 2, 2022. The disclosure of each of the above applications is incorporated herein by reference in its entirety.

FIELD OF THE INVENTION

The present invention relates to repairing tubular elements, particularly pipelines for methane gas or other fluids.

KNOWN ART

The appearance of damages in tubular elements, particularly tubular elements used for building pipeline networks above ground or underground for the distribution of water, methane gas and other fluids, is unfortunately inherent to the operation of the networks and to the degradation which it involves. In addition, in some situations the damages may appear for reasons other than degradation, e.g. for minor landslides or subsidence of the ground, for the electrochemical corrosion caused by stray currents, or due to external mechanical actions (especially in the case of pipelines above ground) which are added to the action of the pressurized fluid within the tubular elements, leading to strains which pose a danger to the integrity of the tubular element itself.

Repairing damages in tubular elements is therefore a frequent task, but with the currently available means this is far from being an effective intervention in the long run and/or far from being an economically sustainable solution. In many instances, repairing is carried out without consolidating and protecting the repair from external agents; in other instances, if safety measures are taken, they frequently turn out to be more vulnerable than expected. As a result, the filler material used to occlude the lumen of a damage may be displaced, impaired or exposed to faster degradation. The solution to such drawbacks by means of currently known means involves excessive costs, so that the choice is often made to completely replace the pipeline section which is affected by the damage.

OBJECT OF THE INVENTION

The invention aims at solving the technical problems outlined in the foregoing. Specifically, the invention aims at providing a kit and a method for repairing damages in tubular elements, particularly pipelines for methane gas or water, which are adapted to achieve a long-lasting consolidation of the repair and an improved protection of the repair itself, without involving higher costs and/or a specific training of the operators.

SUMMARY OF THE INVENTION

The object of the invention is achieved by means of a kit and a method having the features set forth in the claims that follow, which form an integral part of the technical disclosure provided herein in relation to the invention.

BRIEF DESCRIPTION OF THE FIGURES

The invention will now be described with reference to the annexed Figures, which are provided by way of non-limiting example only, wherein:

FIGS. 4, 5 and 6 show steps of a method according to the invention, whereas

DETAILED DESCRIPTION

Figures 1, 2, 3:
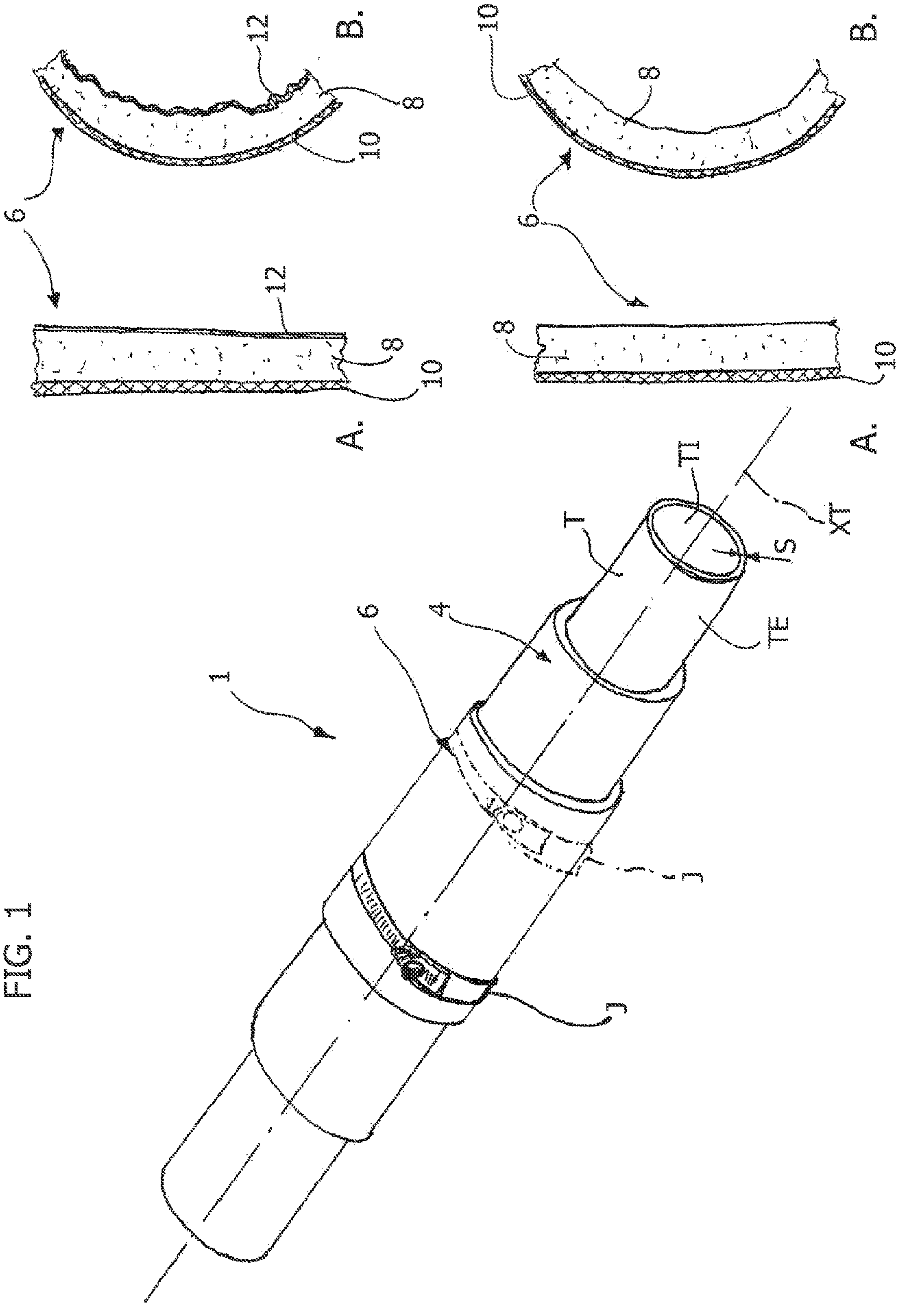
FIG. 1 is a schematic perspective view of a repair kit according to the invention, in the implemented condition.
FIGS. 2 and 3 are schematic views of an element of the repair kit according to the invention, wherein a portion A of each Figure shows the element in a rest condition, while portion B shows the element in deformed conditions.
Figure 4:
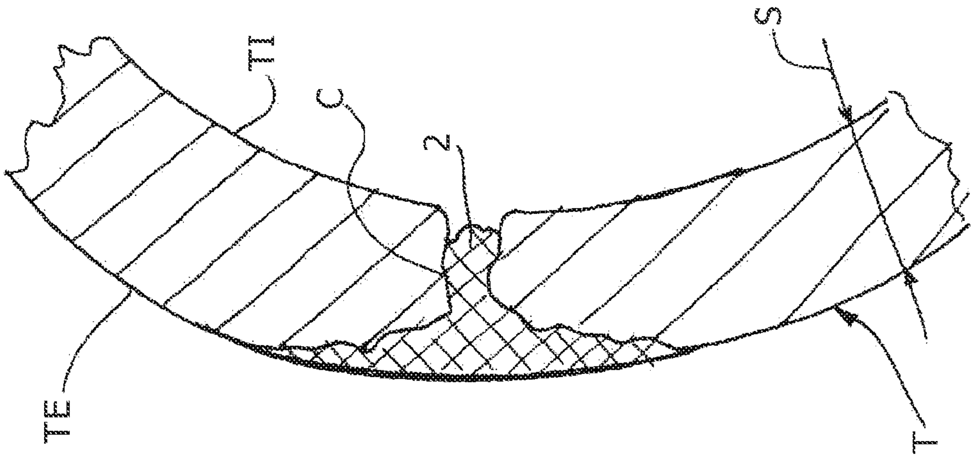

Reference number 1 in FIG. 1 generally designates, in implemented conditions, a kit for repairing damages in tubular elements T, particularly methane gas pipelines, according to the invention. The tubular element T extends along a longitudinal axis XT and comprises an inner surface T1 and an outer surface TE, which are divided from each other by the thickness of a wall S. FIG. 4 shows the development of a damage C in the tubular element T, specifically into the thickness of wall S. The damage C practically defines a lumen which brings about a communication of the space outside tubular element T with the space (the internal lumen) inside the tubular element, so that the tubular element T is pervious to the fluid—specifically, the gas—flowing therein.

Referring to FIGS. 1-4, the kit 1 comprises:

- a filler material 2, configured for application at the damage C in order to occlude the lumen of the damage; however, the filler material 2 is optional, because the use thereof depends on the embodiments and on the type of repair, as will be described in the following;
- a lining material 4, configured for application onto the tubular element T, specifically onto the outer surface TE thereof, in such a position as to cover the lumen of damage C (or damage C in general), and specifically at a position (radially) external to the filler material 2, if the use of the latter is envisaged, and which is therefore configured to externally cover damage C by occluding the lumen thereof, possibly in addition to the filler material 2, if the use of the latter is envisaged, by coating the same,
- a shell 6 configured for application onto at least part of said lining material 4 at a position (radially) external to the lining material 4 (i.e., over the lining material 4, so that it is arranged externally thereto).

The filler material 2 may comprise a resin which is viscous at room temperature, therefore in the physical state of a paste which can be extruded and applied onto a substrate. As may be seen in FIG. 4, the function of the filler material 2 consists in filling damage C by occluding the lumen thereof and in establishing again the fluid tightness (specifically, the gas tightness) at damage C. Damage C may consist of a hole, a crack or a removal of material, due to an internal or external corrosive action. The filler material 2 has, at application, an apparent viscosity greater than 2 Pa·s, more preferably greater than 10 Pa·s, even more preferably greater than 20 Pa·s, according to ASTM standard D3236-15, in a temperature range of 20° C. to 80° C. (inclusive), i.e., in the temperature range for application of material 2. Moreover, the filler material 2 has, at the time of application and in a temperature range of 20° C. to 50° C. (inclusive), a permanent deformation of more than 10% (in the direction of compression) when it is subjected to a pressure not exceeding 3 MPa, more preferably not exceeding 1.5 MPa, even more preferably equal to or lower than 0.7 MPa; the test may be carried out according to ASTM standard D695, by using cylindrical samples with a diameter of 12.7 mm and a height of 25.4 mm, and by measuring the height of the sample at the end of pressure application.

After or before the application onto damage C, the viscosity of material 2 may be different, due to the chemical reactions which may take place therein, e.g., due to the mixing of two components which together will form the filler material. For example, the filler material may comprise a paste made of epoxy resin which, a few minutes before application, may be mixed with a catalyst or curing agent which brings about a gradual crosslinking thereof. Examples of filler materials which may be used comprise, e.g., the repair putties known with the trade names Sylmasta AB Original Epoxy Repair Putty e J-B Weld WATERWELD™ EPOXY PUTTY.

The inventors have observed that said values of viscosity and deformability are optimal for using material 2—substantially—as a filler material or "putty" to occlude damage C. Viscosity values lower than the inferior limit would make the material 2 more prone to the penetration of the fluid into tubular element T during application, or would even increase the risk of dispersing material 2 within tubular element T during application. On the other hand, a lower deformability than envisaged would make the penetration of material 2 into damage C very difficult, and would contrast the shaping thereof and the achievement of structural with a continuity the surrounding wall. In this regard, it must be remarked that material 2 does not necessarily need to penetrate damage C throughout the thickness of wall S; it is sufficient to reach a penetration which ensures adhesion with the surrounding surfaces and which withstands the pressure of the fluid within tubular element T, substantially in order to avoid the forced expulsion thereof.

In embodiments specifically addressing the repair of tubular elements wherein fluids flow at high pressures (for example at about 10 bar), the filler material 2 may be replaced by or combined with other filler materials, configured to achieve a rapid occlusion of damage C by means of an interlocking and/or press-fit insertion into damage C (which may be a hole or a crack) to be repaired, such as plugs, wedges or inserts, which are preferably made of elastomeric material.

According to the invention, the lining material 4 comprises continuous fibers with an elastic modulus according to ASTM C1557 standard equal to or greater than 20 GPa, and a tensile strength according to ASTM C1557 standard equal to or greater than 200 MPa. In preferred embodiments, the continuous fibers have an elastic modulus according to ASTM C1557 equal to or greater than 20 GPa, preferably equal to or greater than 40 GPa, still more preferably equal to or greater than 60 GPa, a tensile strength according to ASTM C1557 standard equal to or greater than 200 MPa, preferably equal to or greater than 500 MPa, and still more preferably equal to or greater than 800 MPa.

The lining material 4 comprises at least one first layer of sheet material, onto which the continuous fibers are attached, wherein the layer of sheet material is gas impermeable. Always preferably, the lining material 4 comprises a second layer of sheet material, and is made in such a way that the continuous fibers are arranged between the first layer of sheet material and the second layer of sheet material, the two layers being in turn coupled to the continuous fibers by means of an adhesive or a low-melting polymer, which optionally also acts as a matrix for the fibers. For example, it is possible to use hot glue or resins of ethylene vinyl acetate (EVA), polyolefins, polyamide, polyesters, polyurethanes, silicones; the use of catalysts or curing materials (e.g., isocyanate) improves the gluing performance, by promoting the crosslinking of polymer chains.

In this way, the tangential actions exerted onto the first/second layer of sheet material may be transferred to the continuous fibers, therefore putting them in traction. The first and/or the second layer of sheet material of lining material 4 may comprise a film of polyethylene terephthalate (PET), polyethylene naphthalate (PEN), other polyesters, polyamide or polyvynil fluoride.

The continuous fibers of lining material 4 are preferably fibers made of (or mainly made of) UHMWPE, polyester, polyacrylate, polybenzoxazole (PBO), glass or aramid fibers, and they are oriented at least along two directions in the plane of the laminate.

Figure 5:
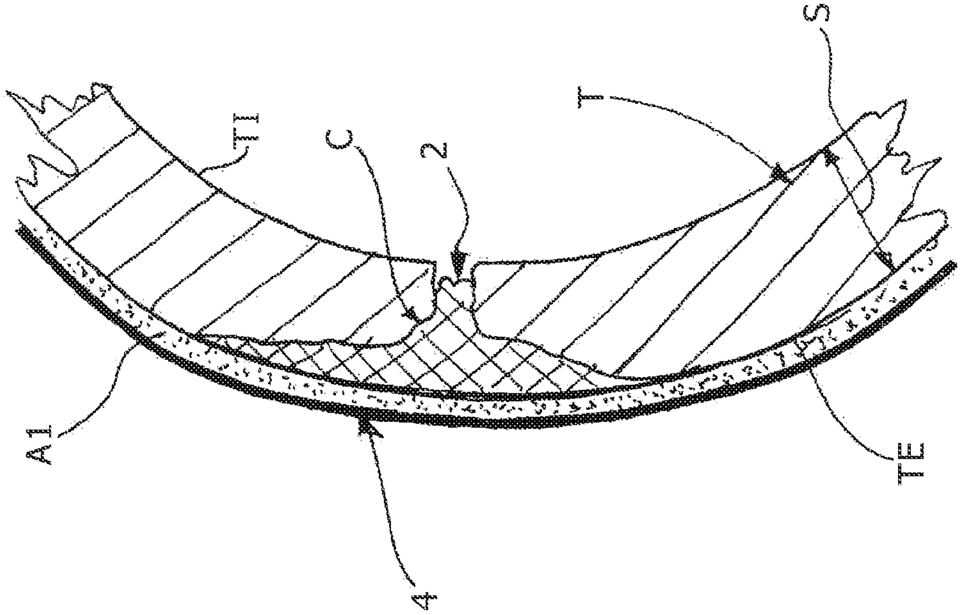

In preferred embodiments (FIG. 5), the lining material 4 is therefore a thin and flexible composite laminate, having a thickness lower than 1 mm (preferably lower than 0.5 mm, so as to increase flexibility), adapted to be wound in a plurality of layers around tubular element T (i.e., adapted t perform one or more winding turns around element T). In preferred embodiments, the lining material 4 comprises a laminate material known with the trade name DCF (Dyneema Composite Fabric), which meets the requirements mentioned in the foregoing.

An example of lining material 4 comprising two layers of sheet material, between which there is arranged a matrix wherein continuous fibers are embedded, is described in document U.S. Pat. No. 5,470,632.

In alternative embodiments, the fibers of the lining material 4 are covered by spreading thereon, during the manufacturing process, a polymer acting as a matrix, and therefore the lining material 4 is configured as a fiber-reinforced membrane without coating sheets. For the matrix it is possible to employ ethylene vinyl acetate (EVA), polyolefins, polyamide, polyesters, polyurethanes, silicones, perfluorocarbides, polyvinylchloride. Such alternative embodiments are adapted to repair pipelines for liquids, while for gas pipelines it is more suitable to employ lining sheets, which are more gas impermeable.

The application of the lining material 4 preferably takes place by applying a double-sided adhesive (or in any case, an adhesive) layer A1 between the surface TE (and the portion of the filler material 2 facing outwards) and the inner surface of the lining material 4. The adhesive or double-sided adhesive layer A1 may comprise for example a gluing layer G (comprising, e.g., an acrylic or polyester-based glue), and may preferably be applied (FIG. 5A) with the interposition of a lining layer M positioned between the surface TE and the gluing layer G. FIG. 5A shows an embodiment wherein the layer A1 in turn comprises a layered arrangement, including the lining layer M and the gluing (or double-sided adhesive) layer G.

The material of layer M, being deformable, penetrates through the asperities of the surface TE and in possible surface plies of material 4, pushed by the pressure exerted thereon by the application of material 4 itself, therefore preventing possible fluid leaks, coming from the interior of tubular element T, from finding a preferential way out. Moreover, the layer M contributes to avoid problems of adhesion of material 4 to the tube, which may arise due to a possible difference in height at the edge of the filler material 2, especially in the case of a hasty or wrong application.

In some embodiments, the adhesive/double-sided adhesive layer A1 is already configured as a two-component layer, comprising the lining layer M and the gluing layer G, and it is provided already applied to the lining material 4, the layer G adhering to the material 4 and the layer M being exposed or protected by a film, if on the layer M a veil of glue is applied for the adhesion to surface TE. Moreover, in some embodiments (FIG. 5B) it is possible to envisage the presence of a layer A1 comprising layer G but not comprising layer M.

Figure 5B:
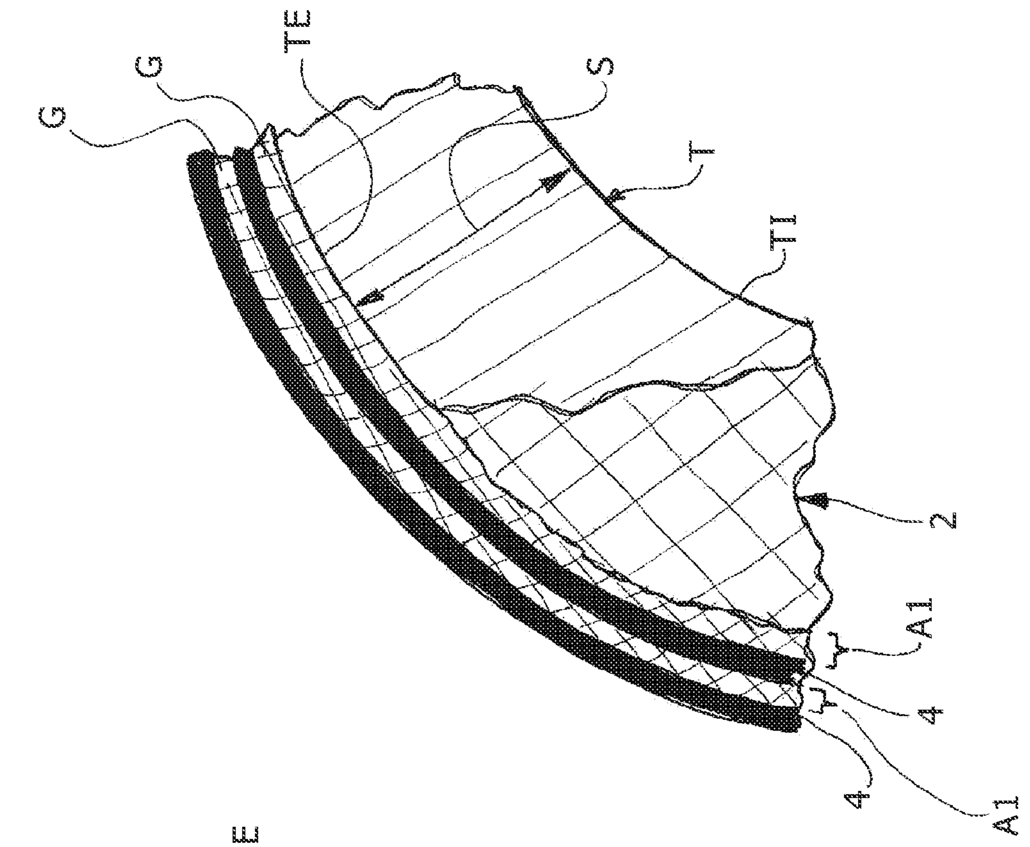
FIGS. 5A, 5B, 5C, 5D are enlarged views corresponding to FIG. 5 and showing various embodiments.
Figure 5A:
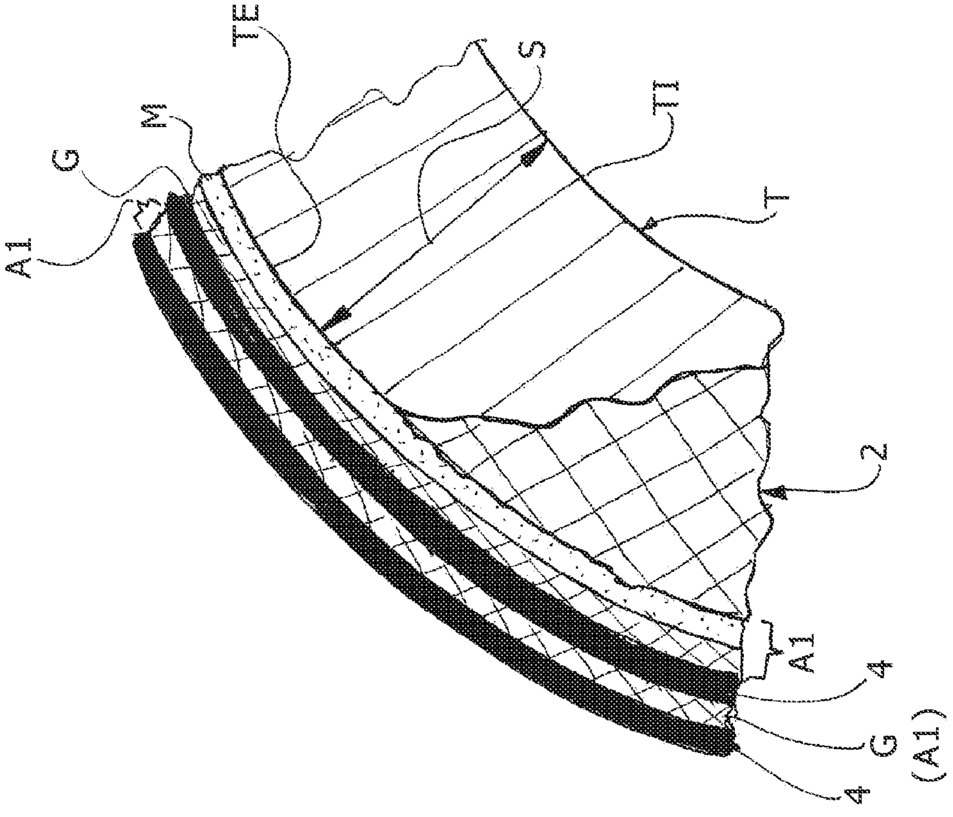

In any case, in the Figures other than FIGS. 5A and 5B, the layer A1 is represented—due to the scale of the drawing—without showing the composition or the internal layering as in FIGS. 5A, 5B (which, being enlarged, allow for a more detailed representation), and for the same reason the lining material 4 is shown as comprising a single turn/a single layer. In any case, the representation of the thicknesses of the various layers and/or materials is not to scale in the Figures, its sole purpose consisting in being useful for the present description.

The lining layer M preferably comprises a layer of rubber or closed-cell foam, having a maximum thickness of 2 mm (preferably lower than 1.5 mm) and acting as a seal between the surface TE and the inner surface of the first layer of lining material 4.

The layer A1 (irrespective of the composition or structure thereof) is preferably applied in advance onto the surface of the lining material 4 which will be arranged radially internally in every layer when the lining material 4 is applied (in the same way as the gluing layer on an adhesive tape), and it is preferably protected by a film until material 4 is applied. When material 4 is applied, the protective film is removed, and layer A1 may cure while contacting the surface carrying the lining material 4. It must be kept in mind that the lining layer M, if present (whether integrated or not integrated into layer A1) is arranged only at the first turn of lining material 4, while the following turns are interposed with layers 1 including only layer G, without any further lining layer. Some embodiments may envisage a kit comprising a range of various lining materials 4, which are adapted to implement turns of lining material having a progressively increasing diameter.

As for the material of layer M, it is possible for example to use an acrylic foam having a density higher than 300 $kg/m^3$ (the higher the density, the higher the impermeability to gases and the better the mechanical characteristics), preferably higher than 500 $kg/m^3$, which must be applied onto an area which is at least wider than the area whereon the filler material 2 is applied.

As stated in the foregoing, in the embodiments wherein the lining layer M is an integral part of layer A1 (i.e., layer A1 is a two-component layer), the foam or rubber of the lining layer M preferably has a layer/veil of glue (not shown) on the face adhering to the surface TE, protected by a film before application; at application, the protective film is removed and the glue can cure. It is possible to use double-sided adhesive tapes which are already integrated with a foam or rubber (thereby obtaining a combination of the layers G and M), for example the acrylic foam tape having the trade name 3M™ VHB™ 4613F.

More generally, the foam or rubber of layer M may be coupled in advance (while manufacturing the repair system) to a portion of the (laminated) lining material 4 to be wound around the tubular element T, and in this case it performs, as stated in the foregoing, the function of a seal by being compressed, when material 4 is used, between the surface TE carrying material 2 and the material 4, which is resistant to traction.

Moreover it must be kept in mind that, in the embodiments envisaging the use of a layer A1 including or integrated with layer M, it is possible to achieve a repair of a damage even without using the filler material 2. This may be the case of damages C having a lumen which is not particularly pervious (e.g. a through crack with no removal of the wall material of tubular element T), or of damages C which are not through-holes, i.e., which do not have a proper lumen and may have been caused, for example, by accidental bumps, such as the impact of an excavator bucket against the tubular element T at a construction site.

Figure 5D:
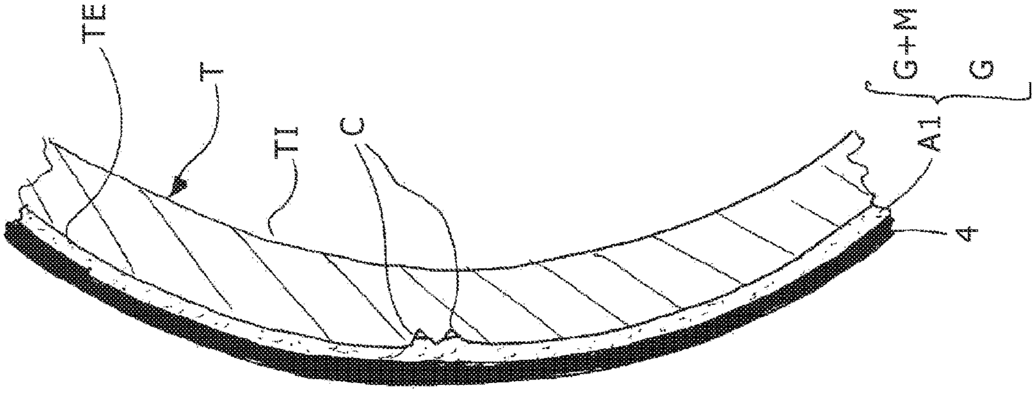
Figure 5C:
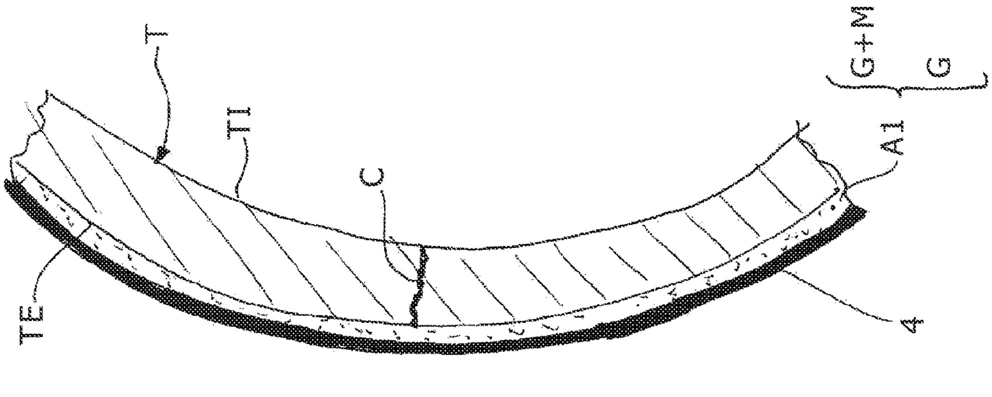

In such embodiments, depicted in FIGS. 5C and 5D (what is shown in the remaining Figures with reference to tubular elements having damages C with a fully pervious lumen also applies, with the exception of material 2, to the object of FIGS. 5C and 5D), the deformation properties of layer M are used in such a way as to obtain—when the lining material 4 is applied onto surface TE—a covering of damage C whereby the material of layer M is made to penetrate as much as possible into damage C. In the case of a damage C forming a through hole, but without a lumen which is not particularly pervious (e.g. a through crack)—FIG. 5C—the application of the lining material 4 compresses the lining layer M onto crack C, thereby sealing the latter. It must moreover be remarked that in these embodiments, especially if the fluid flowing within tubular element T is a non-critical fluid as regards possible leaks, it is even possible to seal the damage C without using a lining layer M. In such cases, the application of the lining material 4 may seal the damage C by means of the layer G only. The same is true in the case of a damage C that does not comprise a through hole: if it is present, layer M may penetrate within damage C in the extent permitted by the deformation properties of layer M, while if the latter is not present the lining material 4 may simply cover damage C with the presence of layer G only.

At the moment of application, the continuous fibers of the lining material 4 are therefore able, by being subjected to traction thanks to the transmission of forces across the first and/or second sheet layer, to compensate for the pressure exerted by the fluid within tubular element T, and to make up for the loss of the mechanical properties of the damaged tubular element T; at the same time, the material 4 deforms only negligibly under the action of the tensile forces, therefore avoiding a displacement of material 2 (if present) away from damage C, which would allow the fluid to leak out from the inside of the tubular element.

To sum up, the lining material 4 performs the functions of:
- a physical obstacle, thanks to the first and the second layer of sheet material. The material 4 prevents possible fluid leaks which may find their way through the filler material 2 used for repairing, and if material 2 is not present, material 4 anyway acts as a barrier against fluid leaks;
- compressing the filler material 2 (if present) thanks to a pretension of the lining material 4 (which may be adjusted during the application). This compensates for the pressure exerted by the fluid within tubular element T, which tends to expel the filler material 2 inserted into damage C, and in general keeps the lining material 4 in place even when the filler material 2 is not present;

recovering the ability of the tubular element T to withstand the tangential traction tensions produced by the internal pressure, which would promote a widening of the cracks both in areas away from damage C—i.e., in areas where collapse is not evident yet—and at the damage C, with the secondary effect of breaking the continuity with the filler material 2 and paving the way to gas leaks. In the embodiments wherein the filler material 2 is not envisaged, of course, the breach of continuity is not relevant;

insulation of the damaged area and protection thereof from corrosive phenomena.

Referring to FIGS. 2A, 2B, 3A, 3B and 7, 8, the shell 6 comprises a first layer 8 and a second layer 10, wherein the first layer 8 is configured for facing towards the lining material 4, and the second layer 10 is configured for facing outwards.

The first layer 8 has a compression modulus of elasticity according to ASTM D1621 and C365/C365M standards between 10 MPa and 5 GPa, and a thickness between 2 mm and 50 mm, and the second layer 10 has a flexural modulus of elasticity according to ASTM E855 or D790 standards, alternatively (according to the material), greater than or equal to 1 GPa, and thickness preferably between $(90/E)^{1/3}$ mm and (1/E) mm, wherein E represents the numerical value of the flexural modulus of elasticity according to ASTM E855 or D790 standards, alternatively (according to the material), expressed in GPa. Such a relationship is empirical, and it is found by means of experimental tests: the upper limit prevents the layer from being difficult to bend and wind around the tube, while the lower limit guarantees that the layer will not undergo excessive deformations when it is subjected to compression or traction stresses, so that it may perform its stiffening function.

In preferred embodiments of shell 6, the latter has the following properties (individually or in combination):

the first layer 8 has a compression modulus of elasticity according to ASTM D1621 and C365/C365M standards between 30 MPa and 2 GPa, and preferably between 50 MPa and 500 MPa, the first layer 8 has a thickness between 3 mm and 40 mm, preferably between 4 mm and 20 mm, the second layer 10 has a flexural modulus of elasticity according to ASTM E855 or D790 standards, alternatively, greater than or equal to 2 GPa, preferably greater than or equal to 4 GPa the second layer 10 has a thickness preferably between 0.1 mm and 3 mm, preferably between 0.2 mm and 2 mm.

With said properties, layer 8 is sufficiently rigid to transmit the forces between tubular element T and the inner layers of the repair, i.e., materials 4 and 2 (if present), but it has a sufficiently deformable surface as to enable conforming the shell 6 to the lining material applied to the tubular element, which in turn conforms thereto. This favours the adhesion of shell 6 onto material 4, which preferably takes place by way of a second adhesive (or double-sided adhesive) layer A2. The layer 8 also performs, in combination with layer 10, the function of dissipating vibrations and it protects from bumps and accidental penetrations, and in combination with the previously stated elastic modulus features it brings about an increase of the surface inertia properties of the section surface of shell 6 (by distancing layer 10 from tubular element T and specifically from the neutral axis). This improves on the ability of shell 6 of protecting damage C from vibrations and from the effects of bending moments.

With the properties stated in the foregoing, at the same time layer 10 ensures the flexibility needed to enable the manual winding of shell 6 around the tubular element T, together with mechanical performances are which sufficient to protect the repair, by supporting the bending forces and the vibrations which otherwise would be discharged on the tubular element T only, in the area of the repaired damage C.

The layer 8 preferably consists of a cellular polymer material or polymer foam, e.g. of poly ethylene terephthalate (PET), polyethersulfone (PES), polyurethane (PU), polystyrene (PS), acrylic or phenolic resins.

In order to favour bending and winding around tubular element T, especially if the layer 8 has a thickness higher than 4 mm, slots/channel may be made on the surface of layer 8 facing towards surface TE.

Preferably, layer 10 comprises a fiber-reinforced material, having continuous or randomly arranged fibers of glass, carbon, aramid or other vegetable fibers, ceramic fibers, metal or polymer fibers having a module of elasticity greater than 20 GPa (ASTM C1557); the fibers are preferably embedded in a polymer matrix having a module of elasticity greater than 2 GPa (ASTM D695), e.g. epoxy resin.

In the embodiments shown in FIGS. 3A, 3B, the layers 8 and 10 are the only layers of shell 6, but embodiments are envisageable as shown in FIGS. 2A, 2B, wherein the shell 6 moreover comprises a third layer 12, so that the first layer 8 is disposed between the second layer 10 and the third layer 12, and the third layer 12 is configured for being applied onto lining material 4 (in other words, the layer 8 still faces towards material 4, but with the interposition of layer 12). In the embodiments including layer 12, the latter is made of a fabric (preferably a fabric having no matrix, with the exception of a possible penetration of the adhesive glue with layer 8) or of a material having the features described for the lining material 4, and preferably being identical to the lining material 4.

Figure 7:
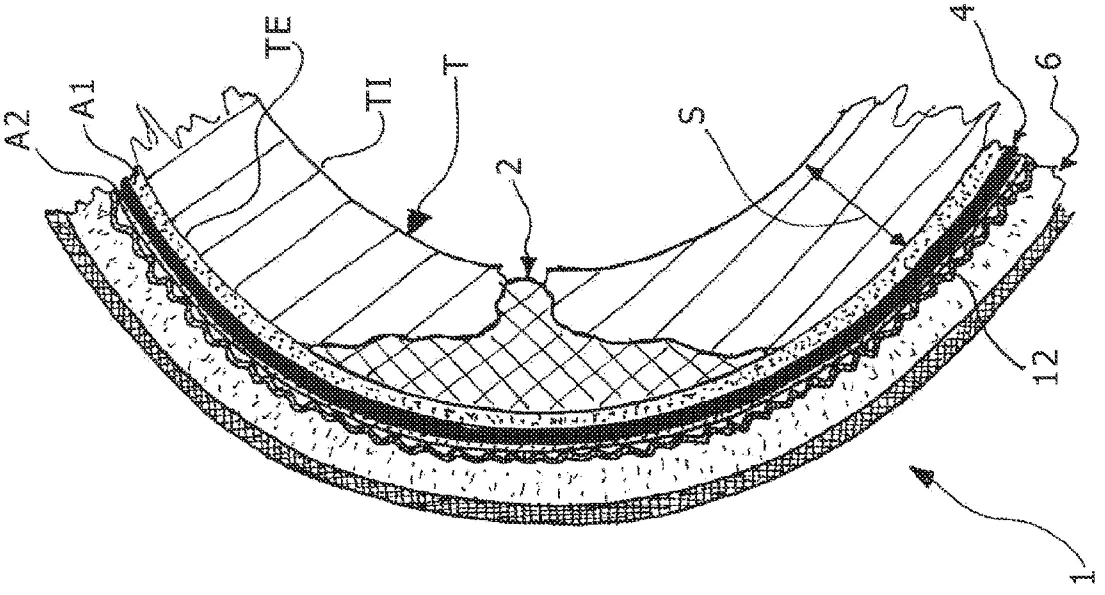
FIG. 7 shows a step subsequent to FIGS. 4 and 6, which refers to the use of the element of the repair kit of FIGS. 3A, 3B.
Figure 6:
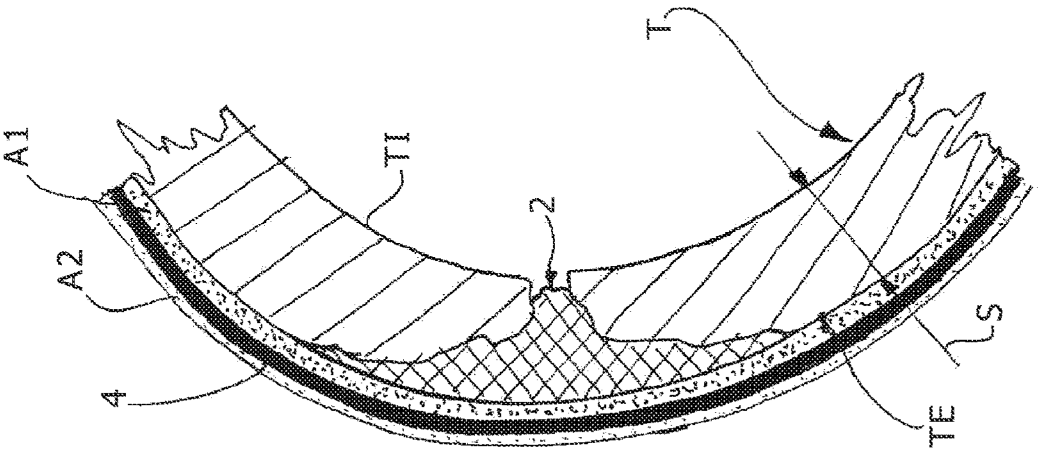
Figure 8:
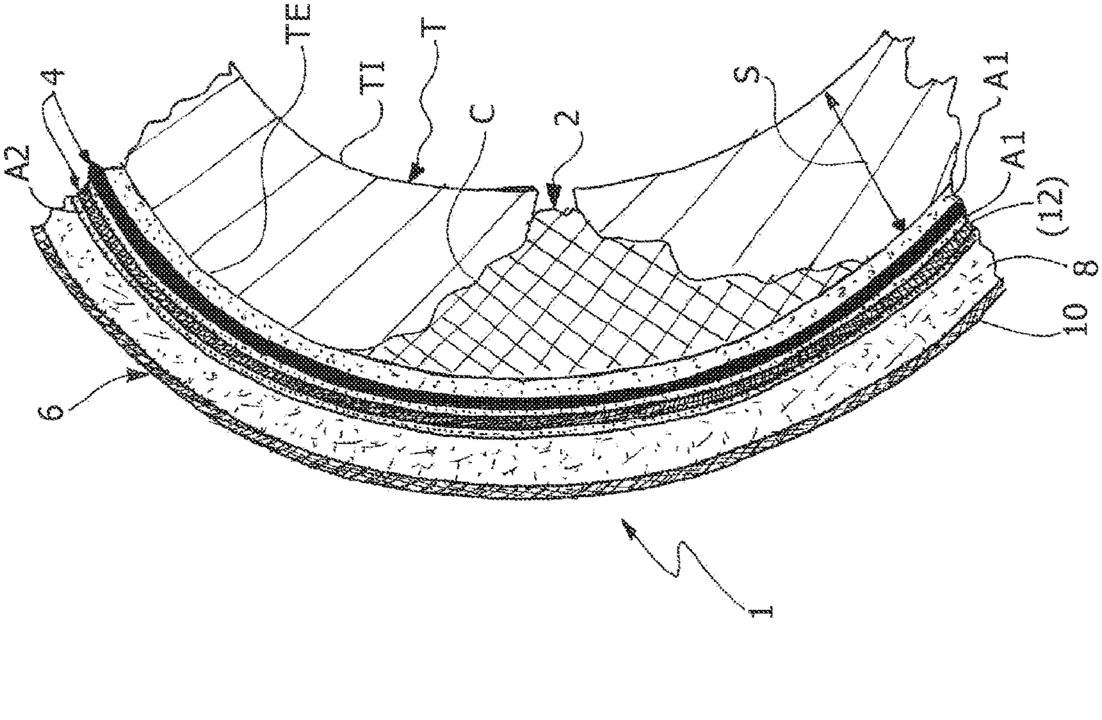
FIG. 8 shows a step subsequent to FIGS. 2-4, but referring to the use of the element of the repair kit of FIGS. 2A, 2B, FIGS. 9 and 10 show an element of the repair kit according to further embodiments of the invention.

FIGS. 7 and 8 show the two different installation arrangements of the shell 6, respectively in the case it comprises layer 12 and in the case it does not comprise it.

When the shell 6 includes layer 12, see FIG. 7, the layer 12 forms a sort of flexible "skin" of the shell 6, adapted to be subjected to strong buckling phenomena without breaking is (buckling even a desirable effect). The appearance of buckling on layer 12 creates wrinkles which are clearly visible in FIG. 7, as they are shown out of scale; in other words, they appear with far more evidence than they actually are. When the layer 12, subjected to buckling and having the adhesive A2 applied thereon, is laid on the lining material 4, the properties of layer 12—specifically, the ability thereof of being subjected to buckling without breaking—enable the shell 6 to conform to the geometry of the underlying lining material, i.e. the material arranged radially internally to layer 12, while keeping the curvature.

In the case of FIG. 8, the layer 8 is totally exposed when the shell 6 is applied onto the lining material 4. In this case, at the application there may be observed a compression of layer 8 and a bending of layer 10, without evident surface buckling phenomena, and the adhesion to the lining material 4 generally takes place on a more regular surface. As described in the foregoing, in preferred embodiments there is no difference between the lining material 4 and the material of layer 12; therefore, at the moment of gluing the shell 6 onto the lining material 4 (by means of the adhesive or the double-sided adhesive layer A2) the last layer of lining material 4, which is the layer arranged at the outermost radial position, changes the configuration of the shell 6 into a three-layer configuration (8, 10, 12) visible in FIG. 7. The third layer, which is added on the spot, is denoted by reference 12 under brackets. In this case, the layer A2 corresponds to a gluing layer between the layers 8 and 12 of shell 6 while, unlike the embodiment of FIG. 7, the layer which glues or fixes the layer (12) onto the lining material 4 is layer A1.

On the other hand, it will be appreciated that the final situation is wholly different from the case of FIG. 7, because in FIG. 8 the third layer 12 is not subjected to any buckling phenomenon. The third layer is glued onto shell 6 in pre-curved and pre-tensioned conditions, as a result of the application onto the tubular element T, and therefore it may further contribute to keep the shape imparted to the shell 6 during application, because the continuous fibers contrast the action of the inner forces inside shell 6, which naturally tend to bring the shell 6 to the undeformed configuration of FIG. 3A.

While keeping these advantages in mind, it must however be remarked how the application of shell 6 in the case of FIG. 8 is technically more complex, because it requires a protection of the layer 8 during transport in order to avoid soiling or damages thereof (the layer 8 substantially comprises foams, or in any case materials having a negligible resistance to incision), which may jeopardize the gluing thereof. Nevertheless, such technical difficulties do not impair in the least the advantages described in the foregoing.

To sum up, the functions of the shell 6 may be outlined as follows:

- increasing the flexural strength of the damaged area of tubular element T;
- implementing a barrier against sharp objects, blades and tools which may penetrate or accidentally damage the repair;
- damping/dissipating, at least partially, the vibrations,
- together with the other elements of the kit, insulating and protecting the damaged area from corrosive phenomena.

According to the invention, a method is thus described for repairing damages C in tubular elements T, particularly methane gas pipelines, by means of kit 1. Generally speaking, the method according to the invention comprises:

- optionally, applying the filler material 2 at damage C, in order to occlude a lumen of the damage,
- applying the lining material 4 onto the tubular element in a position radially external to the filler material, so as to cover the filler material 2; as stated in the foregoing, the application may take place by winding the lining material 4 starting from surface TE and applying a number of turns higher than one, so as to ensure the mechanical and gas-proof sealing. 14. The application of the lining material 4 takes place by conforming the lining material 4 onto tubular element T.

During the application of the lining material 4 it is moreover possible to apply a circumferential pretension (with respect to the final orientation of the tubular element TE), which helps tightening the tubular element T in the area of damage C, and keeping the filler material 2 in place. The application may take place with the help of adhesive A1, preferably arranged between the surface TE and the first turn, and between subsequent turns (for the sake of clarity, the Figures show one adhesive layer A1 only and one layer of lining material only; this also enables showing a few details out of scale);

- applying the shell 6 onto the lining material 4 in a position radially external thereto, and with the first layer 8 facing towards the lining material 4. The application of shell 6 takes place while conforming the shell 6 onto the lining material.

It may moreover be observed, with reference to FIG. 1, that the lining material 4 and the shell 6 may generally be applied with different band widths (i. e., different extensions along axis TX), and specifically envisaging a wider band width for the lining material 4 with respect to the band width of the shell 6.

The shell 6 is preferably laid by cutting the shell material to such a size as to cover at least 250°, more preferably 300°, still more preferably 350°, around axis XT, of the tubular element T.

In an embodiment, the method envisages applying the lining material 4 onto the tubular element T after the application a double-sided adhesive layer, preferably a double-sided adhesive layer comprising acrylic foam, which is arranged between the outer surface TE of the tubular element T and the lining material. Preferably, the double-sided adhesive layer A1 may also be arranged between successive turns of the lining material 4, but modifications are also envisaged wherein the application only regards the surface TE, in order to fix the initial part of the turns of the lining material 4, and the following application only takes place at the last turn, between the last turn and the outer surface of the immediately adjacent, radially internal turn.

Thanks to the kit 1 and to the method according to the invention, it is possible to impart higher strength and durability to the repair of damage C. In this regard, it must be borne in mind that the damage may occur at locations particularly subjected to strain in a tubular element T, and therefore it may constitute a starting point for cracks and fractures which may tend to widen in time, also due to vibrations and swings (e.g., deriving from the passage of vehicles, in the case of a pipeline located underneath a road). Therefore, it is imperative to protect and reinforce the damaged area. The layer 10 of shell 6, thanks to its high elastic modulus and to the distance from the neutral axis of tubular element T, which is increased thanks to the presence of layer 8, will absorb a not inconsiderable part of the compression and tension strains produced by the bending moments acting on the tube. Unlike other stiffening systems, the presence of the layer 8 between the tubular element T (and the lining material 4) and the outer layer 10 (which is comparatively rigid) leads to dampening the vibrations and to a gradual transmission of forces between the material of tubular element T and the shell 6, therefore avoiding excessive tensions at the edges of shell 6.

When the shell 6 is equipped with the auxiliary closing system comprising bands J, it is possible not only to improve the application of the shell 6 and to keep the set geometry (also by more securely fixing the other components of kit 1 while waiting for the resins and glues between the various layers to cure and achieve maximum strength), but it is also possible, in the case of tubular elements T which are part of underground pipelines or tubes, to close and cover the excavation carried out in order to perform the repair without needing to wait for the curing to be completed.

Figure 9:
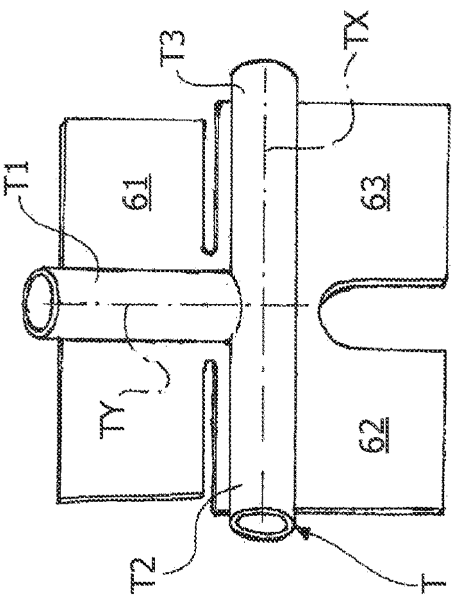
Figure 10:
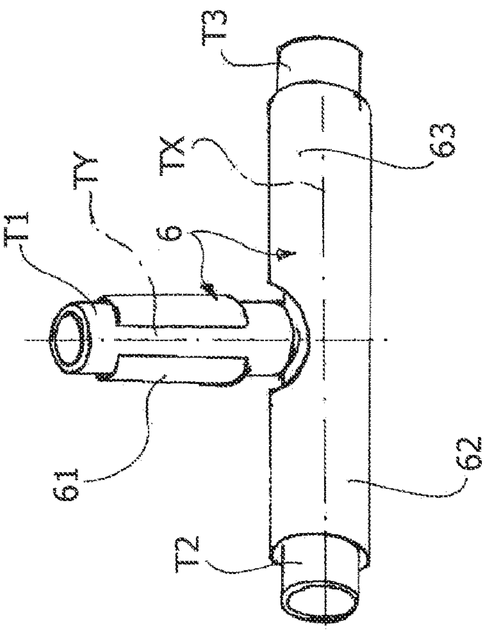

Moreover, the kit 1 intrinsically versatile (the filler material 2 is versatile by definition, and the lining material 4 can be easily adapted to any geometry), and can find a universal use in any kind of tubular element, even having a non-circular section or a non-straight geometry. In this regard, FIGS. 9 and 10 show an embodiment of shell 6 configured for the application on a tubular element T having the shape of a "T" and comprising a branched section T1 and two consecutive sections T2 and T3, with respect to which the section T1 is incident. In this case, the shell 6 is shaped in such a way as to include three flaps 61, 62, 63 which respectively wrap around sections T1, T2 and T3. Such flaps are united in a central node, and for the rest they are divided by means of cuts, in such a way as to enable the separate wrapping of the individual flaps around the respective sections of the tubular element T. For the rest, the repairing method remains unchanged.

Of course, the implementation details and the embodiments may be amply vary with respect to what has been described and illustrated, without departing from the scope of the present invention, as defined by the annexed claims.

The invention claimed is:

1. A kit for repairing damage in a tubular element, comprising:

a lining material configured for application onto an outer surface of said tubular element to cover the damage, a shell configured for application onto at least part of said lining material at an external position to said lining material, wherein said lining material comprises continuous fibers with an elastic modulus according to ASTM C1557 standard of 20 GPa or more, and a tensile strength according to ASTM C1557 standard of 200 MPa or more, and wherein said shell comprises a first layer and a second layer, said first layer being configured for facing said lining material, and said second layer being configured for facing outwards, said first layer of said shell having a compression modulus of elasticity according to ASTM D1621 and C365/C365M standards between 10 MPa and 5 GPa, and a thickness between 2 mm and 50 mm, the second layer of said shell having a flexural modulus of elasticity according to ASTM E855 or D790 standards, alternatively, greater than or equal to 1 GPa.

2. The kit according to claim 1, further comprising a filler material configured for application at the damage of the tubular element to occlude a lumen of said damage, wherein said lining material is configured to be applied on said tubular element at a position radially external to said filler material and to cover said filler material.

3. The kit according to claim 2, wherein said filler material has, at a time of application, an apparent viscosity according to ASTM D3236-15 standard, and in a temperature range from 20° C. to 80° C., greater than 2 Pa·s, and further has a permanent deformation of more than 10% in a direction of compression according to ASTM standard D695, in a temperature range of 20° C. to 50° C., and when subjected to a pressure not exceeding 3 MPa.

4. The kit according to claim 1, wherein said lining material comprises at least one first layer of sheet material to which said continuous fibers are attached, said at least one first layer of sheet material being gas impermeable.

5. The kit according to claim 4, wherein said lining material comprises a second layer of sheet material, said continuous fibers being arranged between said first layer of sheet material and said second layer of sheet material.

6. The kit according to claim 5, wherein said first layer of sheet material and/or said second layer of sheet material are coupled to said continuous fibers by means of an adhesive or a low melting polymer.

7. The kit according to claim 1, wherein:

the first layer of said shell has a compression elasticity modulus according to ASTM D1621 and C365/C365M standards between 30 MPa and 2 GPa, the first layer of said shell has a thickness between 3 mm and 40 mm, the second layer of said shell has a flexural elasticity modulus according to ASTM E855 or D790 standards, alternatively, greater than or equal to 2 GPa, and the second layer of said shell has a thickness between 0.1 mm and 3 mm.

8. The kit according to claim 1, wherein said shell further comprises a third layer, wherein the first layer of said shell is arranged between said second layer and said third layer of said shell, said third layer of said shell being configured for application onto said lining material.

9. The kit according to claim 8, wherein said third layer of said shell is made of said lining material.

10. The kit according to claim 1, wherein said second layer of said shell comprises a fiber-reinforced material comprising fibers having a modulus of elasticity greater than 20 GPa according to ASTM C1557, said fibers being immersed in a polymer matrix having a modulus of elasticity greater than 2 GPa according to ASTM D695.

11. A method for repairing damage in a tubular element by means of the kit according to claim 1, the method comprising:

applying said lining material onto the outer surface of said tubular element to cover the damage, and applying said shell onto said lining material at the external position with respect thereto, and with said first layer facing said lining material.

12. The method according to claim 11, comprising applying said filler material at the damage of the tubular element to occlude a lumen of said damage prior to said applying lining material, said lining material being applied in a position radially external to said filler material and covering said filler material.

13. The method according to claim 11, wherein said applying said lining material to said tubular element comprises arranging an adhesive layer between an outer surface of said tubular element and said lining material.

14. The method according to claim 13, wherein said adhesive layer comprises gluing layer and a lining layer, said lining layer being at a position between the outer surface of said tubular element and said gluing layer.

15. The method according to claim 14, wherein said lining layer comprises an acrylic foam having a density greater than 300 kg/m$^3$.

16. The method according to claim 11, wherein said applying said lining material to said tubular element comprises wrapping said lining material around said tubular element to define a plurality of layers of lining material.

17. The method according to claim 11, wherein applying said shell to said lining material comprises providing an adhesive layer between said lining material and said first layer of said shell, wherein applying said lining material to said outer surface of said tubular element comprises conforming said lining material to said tubular element, and wherein applying said shell to said lining material comprises conforming said shell to said lining material.

* * * * *